(12) United States Patent
Neely (10) Patent No.: US 10,948,624 B1
(45) Date of Patent: Mar. 16, 2021

(54) LWD MINERALOGY/SPECTROSCOPY THERMAL NEUTRON SHIELDING

(71) Applicant: Halliburton Energy Services, Inc., Houston, TX (US)

(72) Inventor: Jeffrey Clayton Neely, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/694,418

(22) Filed: Nov. 25, 2019

(51) Int. Cl.
*G01V 5/10* (2006.01)
*G01V 5/12* (2006.01)

(52) U.S. Cl.
CPC .................. *G01V 5/102* (2013.01)

(58) Field of Classification Search
CPC ... G01V 5/12; G01V 5/10; G01V 5/04; G01V 5/101; G01T 3/02; G01T 1/2018
See application file for complete search history.

(56) References Cited

U.S. PATENT DOCUMENTS

| | | | |
|---|---|---|---|
| 2,956,163 A | 10/1960 | Baker | |
| 5,410,152 A | 4/1995 | Gadeken | |
| 5,434,408 A | 7/1995 | Smith, Jr. et al. | |
| 5,608,214 A * | 3/1997 | Baron | G01V 5/12 250/262 |
| 6,215,120 B1 * | 4/2001 | Gadeken | G01V 5/04 250/256 |
| 7,339,161 B2 * | 3/2008 | Radtke | G01V 5/101 250/268 |
| 8,558,165 B2 * | 10/2013 | Evans | G01V 5/10 250/269.2 |
| 8,809,798 B2 * | 8/2014 | Mendez | G01V 5/12 250/395 |
| 9,417,355 B2 | 8/2016 | Stoller et al. | |
| 2004/0065823 A1 | 4/2004 | Mickael | |
| 2006/0186328 A1 | 8/2006 | Radtke et al. | |
| 2009/0283691 A1 | 11/2009 | Stoller | |
| 2011/0303836 A1 | 12/2011 | Gibson | |
| 2016/0320521 A1 | 11/2016 | Mauborgne et al. | |

OTHER PUBLICATIONS

Foreign Communication from Related Application—International Search Report and Written Opinion of the International Searching Authority, International Application No. PCT/US2019/063160, dated Aug. 13, 2020, 13 pages.
Weller, G., et al., "A New Integrated LWD Platform Delivers Improved Drilling Efficiency, Well Placement, and Formation Evaluation Services," SPE International, 2005, SPE 96652, pp. 1-11, Society of Petroleum Engineers.

* cited by examiner

Primary Examiner — David P Porta
Assistant Examiner — Fani Boosalis
(74) Attorney, Agent, or Firm — Conley Rose, P.C.; Rodney B. Carroll (57) ABSTRACT

A detector assembly disposed about a tubular for placement within a wellbore penetrating a subterranean formation and comprising: a gamma radiation detector disposed within a pressure housing, wherein the detector extends an axial length in a direction parallel to a central axis of the tubular; and a neutron shield disposed about a circumference of the tubular along at least the axial length of the detector, wherein the neutron shield reduces an amount of neutrons that pass from the wellbore and/or the formation through the tubular during operation of the detector assembly, while allowing transmission of gamma rays therethrough to the detector.

20 Claims, 6 Drawing Sheets

LWD MINERALOGY/SPECTROSCOPY THERMAL NEUTRON SHIELDING

TECHNICAL FIELD

The present disclosure relates generally to systems and methods for downhole logging.

BACKGROUND

Mineralogy/Spectroscopy (MS) tools work by emitting neutrons from a radioactive source. The emitted neutrons are captured by certain elements in the formation that then emit gamma rays whose energies correspond to the elements, primarily magnesium (Mg), aluminum (Al), silicon (Si), sulfur (S), potassium (K), calcium (Ca), titanium (Ti), manganese (Mn), and iron (Fe), among others, which are important to petrophysical evaluations. These neutron-induced gamma rays are counted by a gamma ray scintillator in the drilling instrument or "logging tool". The scintillator and an accompanying photomultiplier tube (PMT) generate an electrical signal that can be used to quantify the energy of the detected gamma rays. The quantified energies can be used to assess elemental concentrations in the formation. Such formation elemental concentrations can be used to derive a volumetric breakdown of the minerals comprising the formation.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The term "formation" as utilized herein includes a subsurface formation, a subterranean formation, and a subsea formation. The term "surface" can refer to a surface of the earth or a surface of the sea, from which a logging tool of this disclosure is introduced into the wellbore.

A descriptor numeral can be utilized generically herein to refer to any embodiment of that component. For example, as described herein, a section or subassembly 81 of BHA 80 can refer to any section or subassembly 81A-81E depicted in FIG. 4A, or any other section or subassembly of a BHA known to those of skill in the art. In the same manner, a shell segment 31 of neutron shield 20 can refer to first shell segment 31A, second shell segment 31B, and shell segment 31C of FIG. 1.

The present disclosure provides, in part, a logging (e.g., LWD) tool and method that allow for mechanically robust and cost effective MS (e.g., LWD MS) that allows for mitigation of in-tool gamma ray production by choosing materials for specific portions of the logging tool that do not contain appreciable amounts of elements that are of interest in the formation and by reducing the probability of producing neutron capture reactions in the drilling tool (e.g., a drilling collar thereof) which would lead to the production of unwanted gamma rays.

One beneficial technical effect of the disclosed systems and methods include that neutrons emitted from the radioactive source are less likely to be absorbed by materials that make up the logging tool (e.g., a drilling collar, accompanying parts, and features thereof). Thus, any gamma rays that would otherwise be emitted by the logging tool that are not of value for determining the mineral makeup of the formation, and, depending on the composition of the materials making up the logging tool, gamma rays from elements that are of interest from a petrophysical standpoint, such as, without limitation, aluminum (Al), iron (Fe), manganese (Mn), and titanium (Ti), are prevented or reduced. Because the present logging tool allows for gamma rays for a given element that are produced from within the formation while preventing or reducing those that may otherwise be produced within the tool, the recorded gamma ray information is a more complete and accurate picture of the measurement of formation elements.

Herein disclosed are a detector assembly, a logging tool (which can, in specific embodiments, be a drilling (e.g., an LWD tool) or a wireline tool), and a method of employing such a logging tool that can be utilized to reduce the probability of neutron absorption within the logging tool via the use of a thermal neutron shield that surrounds a drill collar of the logging (e.g., drilling) tool, while maintaining efficient transmission of formation gamma rays to a detector of the detector assembly.

Figure 2:
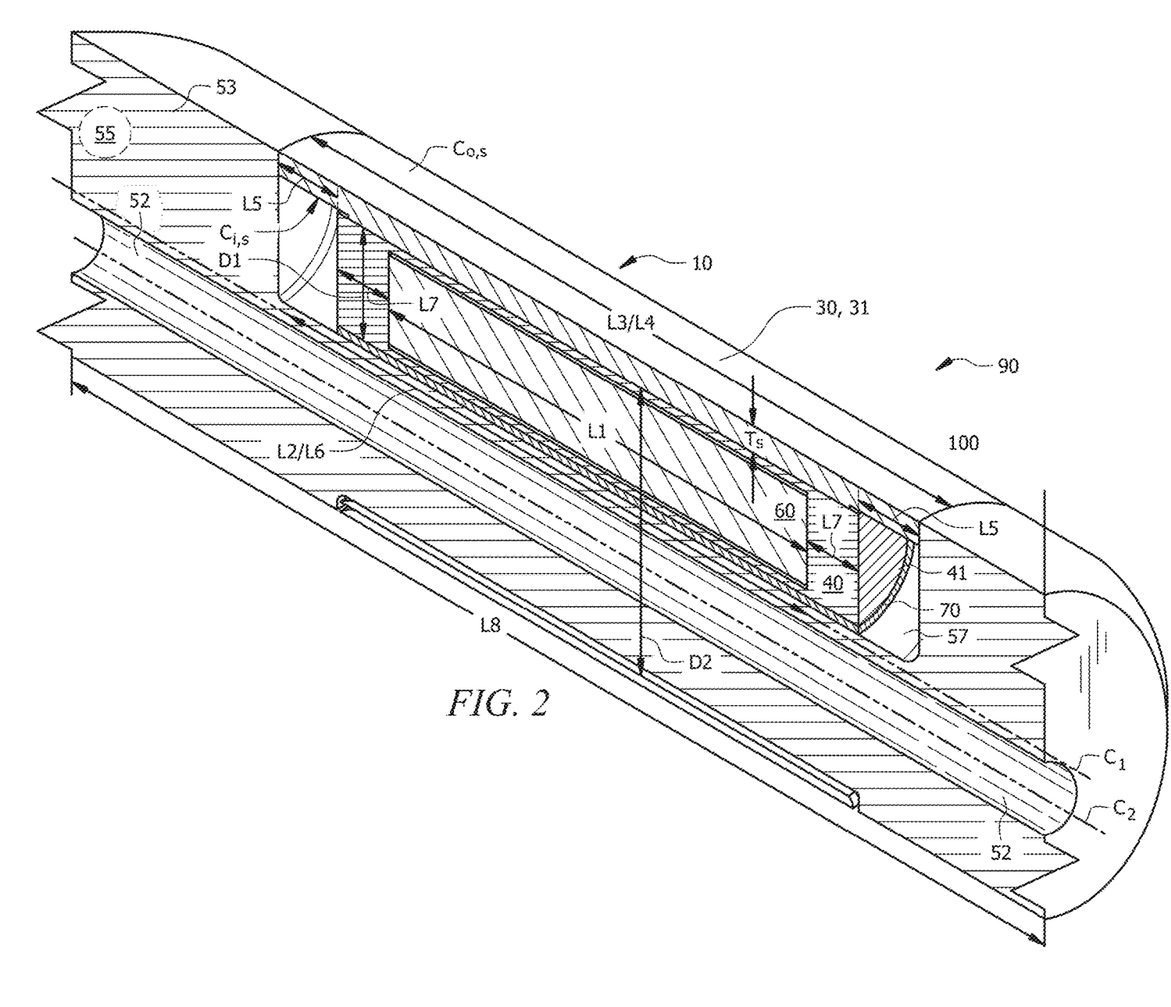
FIG. 2 is a schematic isometric cutaway view of the detector assembly portion of the logging tool of FIG. 1.
Figure 3:
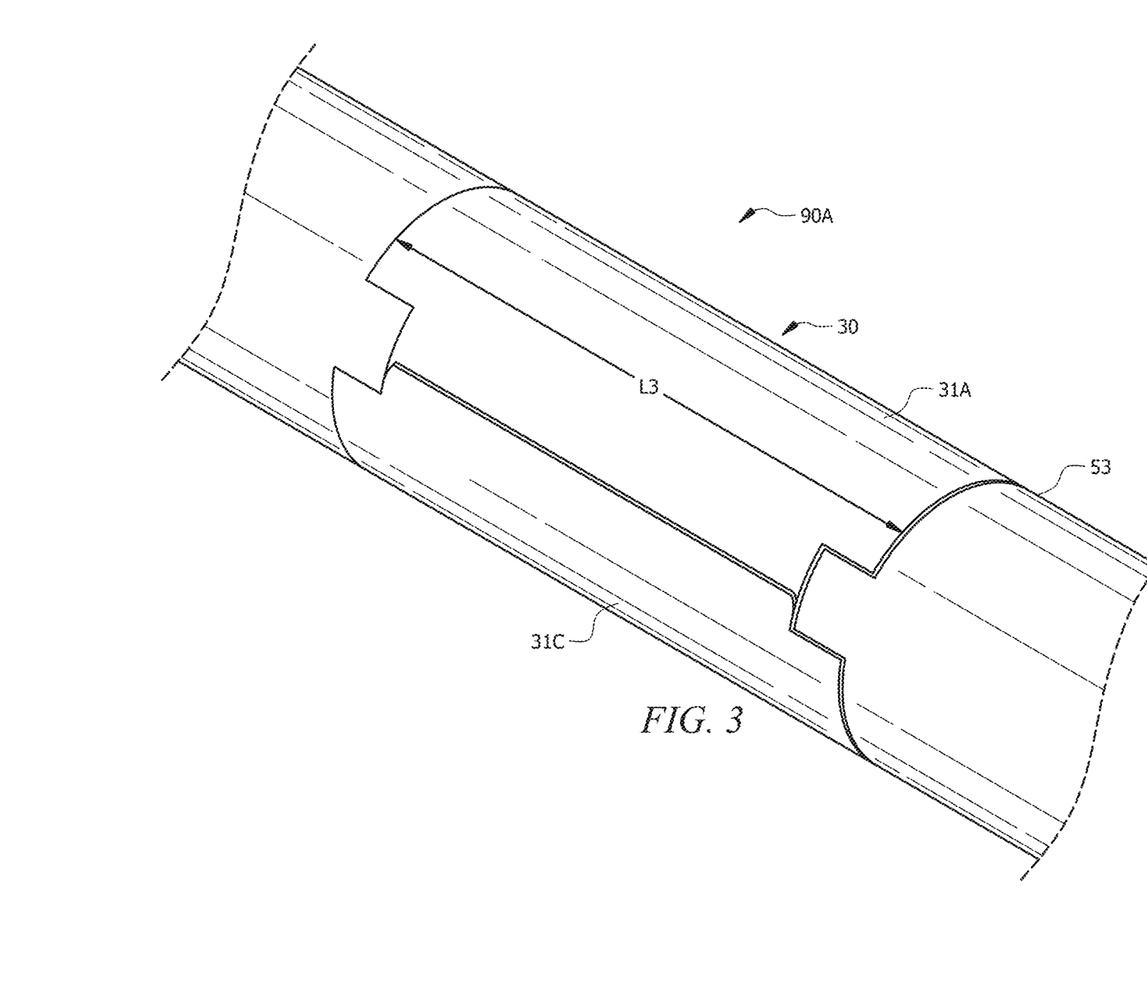
FIG. 3 is a schematic isometric view of the detector assembly portion of the logging tool of FIG. 1.

A detector assembly of this disclosure will now be described with reference to FIG. 1, which is a schematic end cross section view of a portion 90A of an logging tool 90 comprising a detector assembly of this disclosure; FIG. 2, which is a schematic isometric cutaway view the detector assembly portion 90A of the logging tool 90 of FIG. 1; and FIG. 3 is a schematic isometric view of the detector assembly portion of logging tool 90 of FIG. 1. Detector assembly 10 is configured to be disposed about a tubular 53 for placement within a wellbore 12 (also referred to herein as a "borehole"; FIG. 4, described hereinbelow) penetrating a subterranean formation 1 (FIG. 4). Detector assembly 10 comprises a gamma radiation detector 60 disposed within a pressure housing 40. As depicted in FIG. 2, gamma radiation detector 60 extends an axial length L1 in a direction parallel to a central axis C1 of the tubular 53. Detector assembly 10 further comprises a thermal neutron shield 20 (also referred to herein for brevity as a "neutron shield" 20) disposed about an outer circumference $C_T$ of the tubular 53 along at least the axial length L1 of the gamma radiation detector 60. As utilized here, "disposed about" the outer circumference $C_T$ of the tubular 53 indicates that neutron shield 20 (e.g., shell 30 and/or shell segments 31 thereof and/or deposition layer 25 detailed hereinbelow) encircles or surrounds a portion or an entirety of outer circumference $C_T$ of tubular 53, but does not require the neutron shield 20 to be in contact with tubular 53. Thermal neutron shield 20 can be disposed about a portion or an entirety of outer circumference $C_T$ of tubular 53 along at least the axial length L1 of the gamma radiation detector 60. The neutron shield 20 reduces an amount of neutrons that pass from the wellbore 12 (FIG. 4) and/or the formation 1 (FIG. 4) through the tubular 53 during operation of the detector assembly 10, while allowing transmission of gamma rays therethrough to the detector 60.

Logging tool 90 can be utilized to measure "logs" of parameters of interest as a function of depth within the wellbore. Logging tool 90 can be a wireline tool or a drilling tool (e.g., a logging while drilling or "LWD" tool). "Wireline" tools", which are "logging tools" conveyed along a wellbore after the wellbore has been drilled, are conveyed into the wellbore by a wireline, with one end of the wireline attached to the wireline tool and a second end of the wireline attached to a winch assembly at the surface of the earth. Drilling tools are logging tools conveyed along the wellbore by a drill string, and with which measurements are made while the wellbore is being drilled. In embodiments, a detector assembly 10 as described herein is utilized in a drilling tool (e.g., an LWD tool).

Figure 4A:
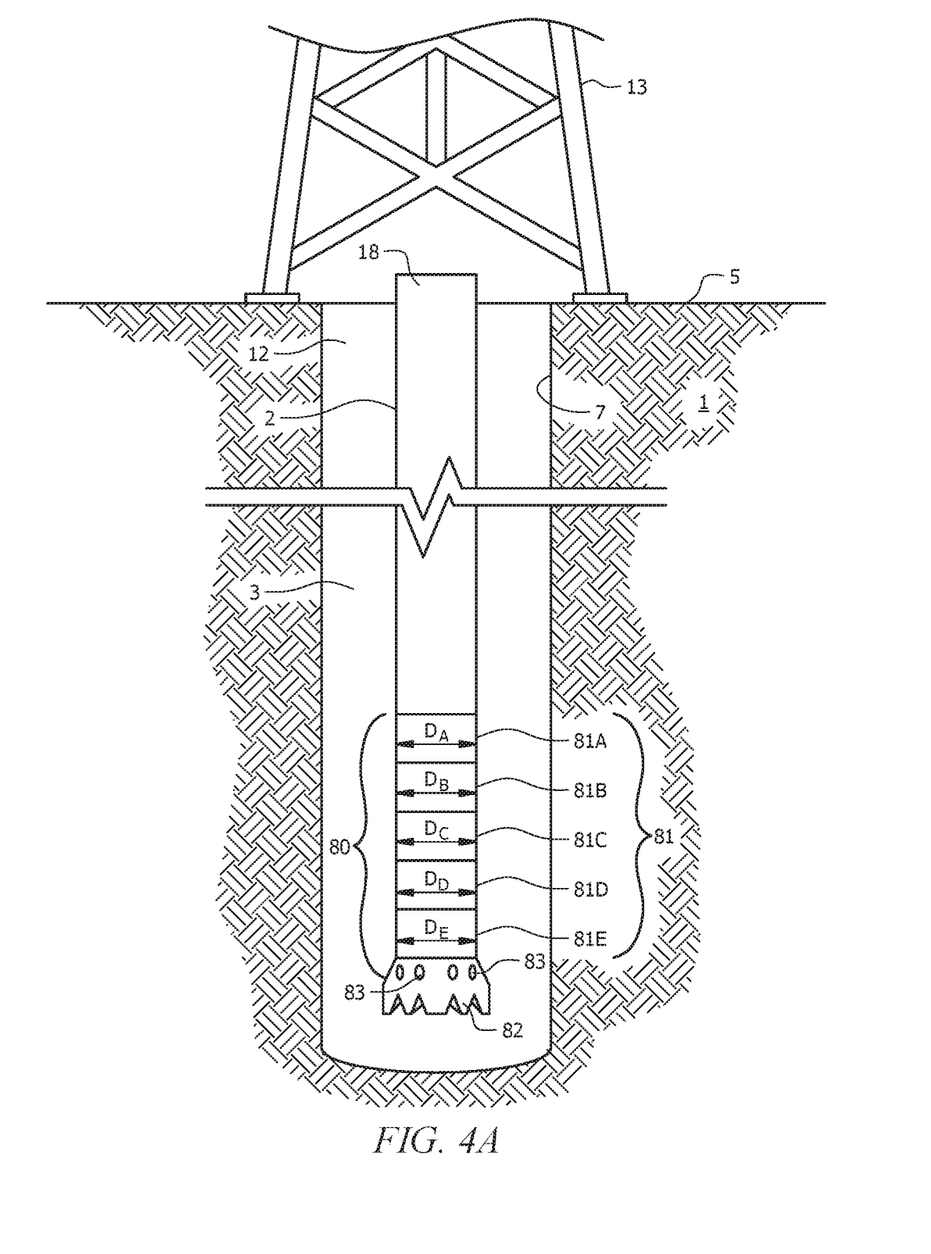
FIG. 4A is a schematic view of a subsurface formation penetrated by a wellbore in which a drilling (e.g., LWD) tool of this disclosure can be positioned via a drill string.
Figure 4B:
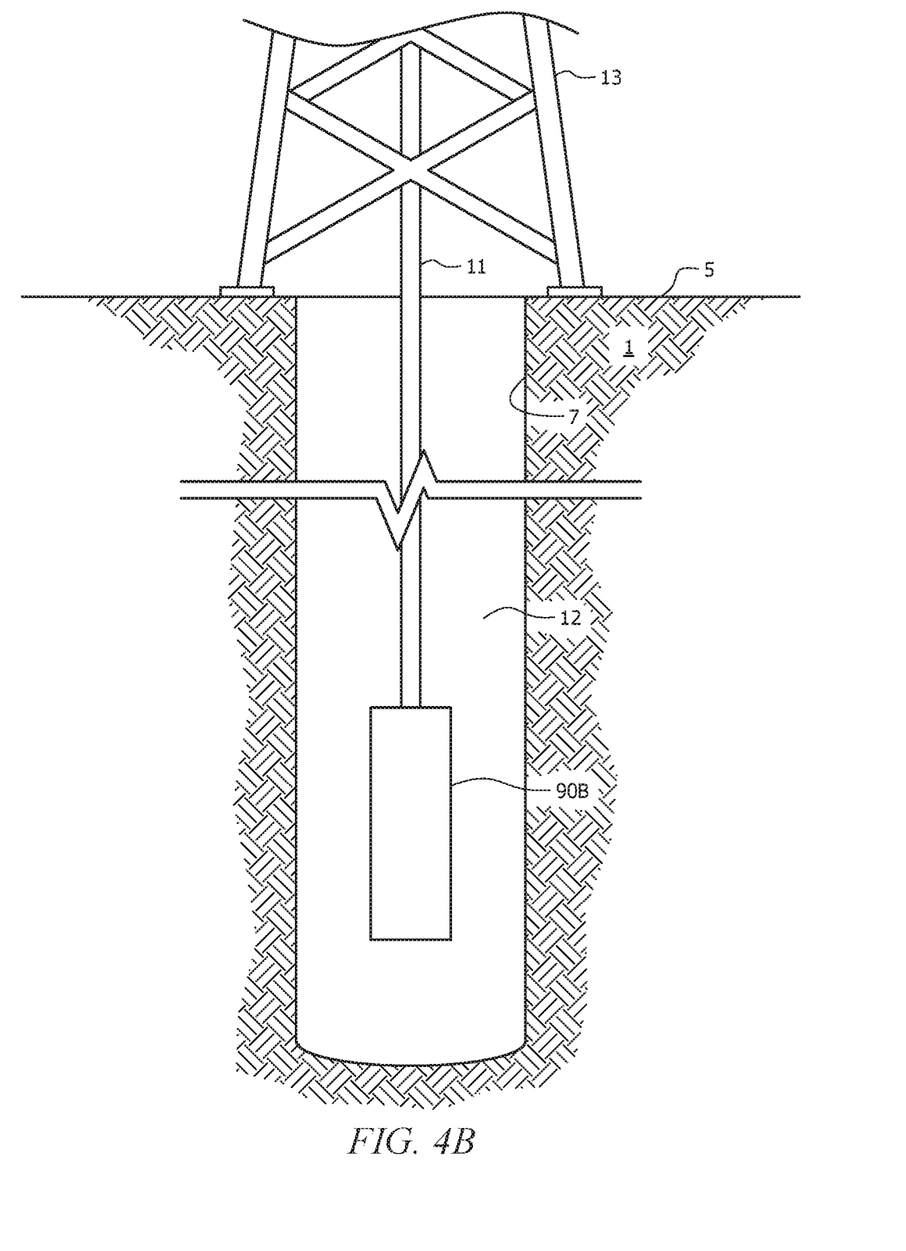
FIG. 4B is a schematic view of a subsurface formation penetrated by a wellbore in which a wireline tool of this disclosure can be positioned via a logging cable.

Tubular 53 can comprise a drill collar. The shape of the tubular (e.g., drill collar) 53 can be optimized for drill string loads. For example, where possible, unnecessary or superfluous material of tubular 53 can be removed to prevent unwanted neutron interactions from occurring within logging tool 90, and to balance the tool 90. For example, in embodiments wherein tubular 53 is a drill collar comprising a fluid flow path 52 that is offset from centerline C1 of tubular 53, material can be removed from tubular 53 to balance a weight distribution within logging tool 90 during operation thereof. As depicted in FIG. 1, a generally triangular section 54 of material can be removed from tubular 53 to reduce the likelihood of unwanted neutron interactions from occurring within logging tool 90. Also, positioning the radiation detector 60 within dedicated pressure housing 40 can enable the presence of less material between radiation detector 60 and the formation 1 (FIG. 4A/4B) than a hatch or pressure sleeve design about an entire circumference $C_T$ of tubular 53 would require. For example, a thickness of a pressure housing about the radiation detector 60 only can be significantly smaller than a thickness of a conventional pressure housing that surrounds the entire tool, assuming the materials and pressure rating are the same. Accordingly, less mitigating material may be required when pressure sealing the radiation detector 60 only versus sealing the entire tool circumference.

Neutron shield 20 can comprise a shell 30 and a deposition material 25 (also referred to herein as a deposition "layer", a "deposition coating", or a "neutron shield coating"). For example, in FIG. 1, neutron shield 20 comprises shell 30 and deposition layer 25. Neutron shield 20 provides that a neutron shield material is placed over the detector 60 (e.g., between pressure housing or "outsert" 40 and formation 1), such that detector 60 is not positioned within an open cavity with direct line of sight to the formation 1. As described further hereinbelow with reference to FIG. 4A, the detector assembly 10 described herein can be robust enough for use in a drilling (e.g., LWD) tool 90A, that is exposed to drilling conditions. The design of neutron shield 20 can accommodate use of a tool 90 comprising the detector assembly 10 in a drilling environment.

Shell 30 comprises a shell material. The shell material of shell 30 can comprise a material having a yield strength sufficient for use in a wellbore 12. The material of the shell 30 (and/or the shell segments 31 and/or the pressure housing 40 described further hereinbelow) can comprise any suitable material known to those of skill in the art, for example, an alloy of cobalt and nickel (e.g., MP35n). For example, shell 30 can comprise one or more elements such that a density of each or a combination of the one or more elements in the shell 30 is less than a density of each or the combination of the one or more elements in the earthen formation 1 (FIG. 4A).

Shell 30 of neutron shield 20 can have any suitable average radial thickness $T_S$. For example and without limitation, in embodiments, shell 30 of neutron shield 20 can have an average radial thickness $T_S$ in a range of from about 0.25 inch (0.64 cm) to about 0.35 inch (0.89 cm), from about 0.20 inch (0.51 cm) to about 0.40 inch (1.0 cm), from about 0.15 inch (0.38 cm) to about 0.50 inch (1.3 cm), greater than or equal to about 0.20 inch (0.51 cm), 0.30 inches (0.76 cm), or 0.40 inch (1.0 cm), and/or less than or equal to about 0.50 inches (1.3 cm), 0.40 inches (1.0 cm), or 0.35 inches (0.89 cm).

Shell 30 can comprise a single shell segment 31 or a plurality of shell segments 31 positioned to provide the shell 30 about the (e.g., entire) outer circumference $C_T$ of the tubular 53 along the at least the axial length L1 of the detector 60. In embodiments, the shell 30 comprises a single shell segment 31. In some such embodiments, the single shell segment 31 can comprise a sleeve. In alternative embodiments, shell 30 comprises a plurality of shell segments 31. For example, in FIG. 1, shell 30 comprises a first shell segment 31A, a second shell segment 31B, and a third shell segment 31C.

The shell 30 can be segmented to allow for the production of the individual shell segments 31 from smaller raw material billets than would be required to manufacture larger pieces or a single "sleeve" shell 30 (e.g., comprising a single shell segment 31), thus avoiding supply issues for larger raw materials. The shell 30 and/or shell segment(s) 31 thereof can attach radially onto the tubular (e.g., drill collar) 53. Alternatively, when shell 30 comprises a single shell segment 31, such as a sleeve, shell 30 can slide axially (e.g., in a direction parallel to central axis C1 of tubular 53) along the tubular 53 during assembly of a logging (e.g., LWD) tool 90 comprising the shell 30. Multi-piece installation provided via the use of a plurality of shell segments 31 can facilitate manufacture of logging (e.g., LWD) tool 90 and can also provide a simpler design whereby other sections of the logging (e.g., LWD) tool 90 do not require a reduced diameter to accommodate a one piece sleeve shell 30.

As noted previously, neutron shield 20 can further comprise a deposition layer or material deposited on shell 30 (e.g., on the single shell segment 31 or on each of the plurality of shell segments 31). The deposition material 25 is capable of absorbing neutrons (e.g., from the wellbore 12) and producing gamma rays having a lower energy than neutron-induced gamma rays produced in the subterranean formation 1. The deposition material 25 can have a high thermal neutron capture cross section, wherein a high thermal neutron capture cross section is defined as a thermal neutron capture cross section of greater than or equal to about 750, 725, or 700 barns/cm². The deposition material 25 can comprise boron, cadmium, or a combination thereof.

For example and without limitation, the deposition material can comprise boron carbide. The deposition layer can have any suitable radial thickness $T_D$, such as and without limitation, a radial thickness $T_D$ in a range of from about 0.050 inch (1.3 mm) to about 0.10 inch (2.5 mm).

Deposition material 25 can be deposited on an inside circumferential area $C_{i,S}$ and/or an outside circumferential area $C_{o,S}$ of the shell 30 along the at least the axial length L1 of gamma ray detector 60. Deposition material 25 can be deposited on a portion or an entirety of the inside circumferential area $C_{i,S}$ and/or a portion or an entirety of the outside circumferential area $C_{o,S}$ of the shell 30 along the at least the axial length L1 of gamma ray detector 60. Deposition material 25 can be deposited on the single shell segment 31 or on each of the plurality of shell segments 31 of shell 30 such that an entirety of the inside circumferential area $C_{i,S}$ and/or an entirety of an outside circumferential area $C_{o,S}$ of the shell 30 along the at least the axial length L1 of gamma ray detector 60 has the deposition material 25 deposited thereon. When shell segments 31 overlap, as described hereinbelow, deposition material 25 need not, but can, be present on the inside circumferential area of the ends of the shell segments 31, whereby the deposition material extends around the entire outer circumference $C_T$ of tubular 53. Shell 30 (e.g., the one or more shell segments 31 thereof) extend an axial length L3 in a direction parallel to central axis C1 of tubular 53. Deposition material 25 can be deposited on the entirety of the inside circumferential area $C_{i,S}$ of the shell 30 along at least the axial length L1 of gamma ray detector 60. For example, deposition material 25 (and shell 30/shell segments 31) can extend axially a length L4 (L3) at least equal to axial length L1 of gamma ray detector 60.

Figure 1:
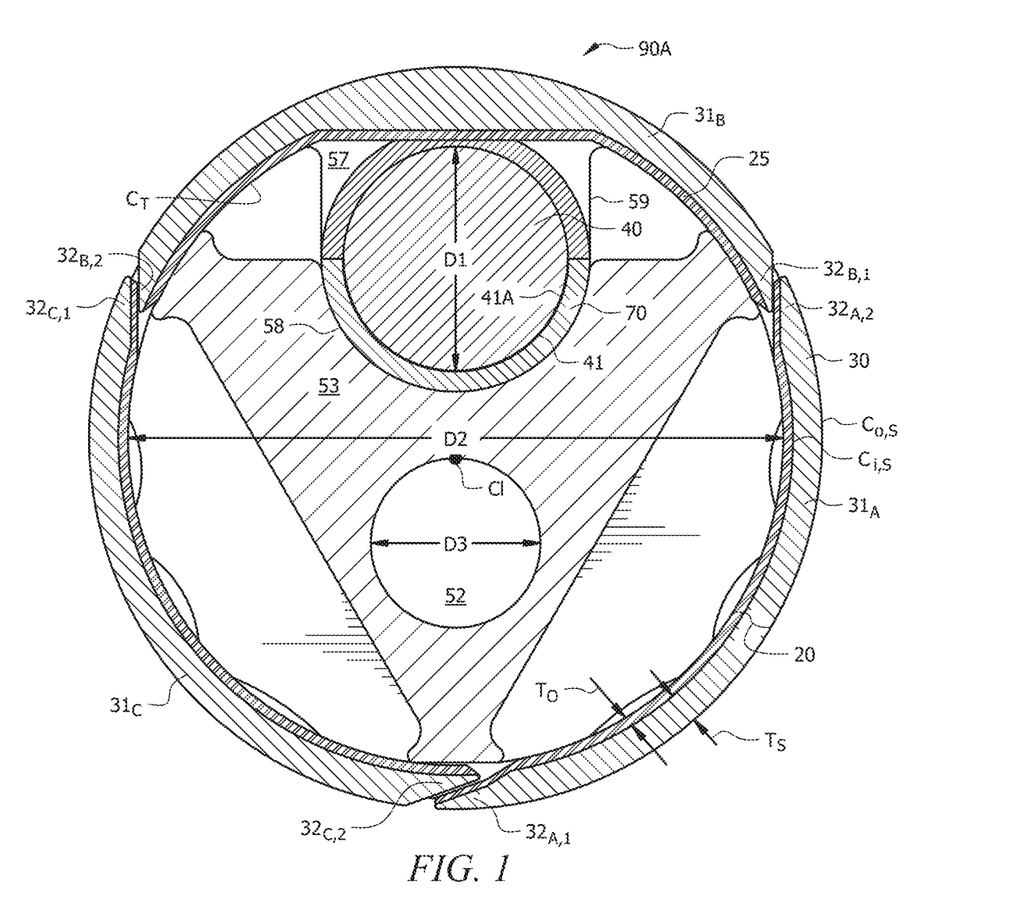
FIG. 1 is a schematic end cross section view of a portion of a logging (e.g., LWD) tool comprising a detector assembly of this disclosure.

In embodiments wherein shell 30 comprises the plurality of shell segments 31 (e.g., first shell segment 31A, second shell segment 31B, and third shell segment 31C, as depicted in FIG. 1), the plurality of shell segments 31 can overlap along ends thereof when positioned within tool 90, to provide the shell 30 about the entire outer circumference $C_T$ of the tubular 53 along the at least the axial length L1 of the gamma ray detector 60. For example, as depicted in FIG. 1, first shell segment 31A comprises first end $32_{A,1}$ and second end $32_{A,2}$, second shell segment 31B comprises first end $32_{B,1}$ and second end $32_{B,2}$, and third shell segment 31C comprises first end $32_{C,1}$ and second end $32_{C,2}$. Second end $32_{A,2}$ of first shell segment 31A overlaps first end $32_{B,1}$ of second shell segment 31B, second end $32_{B,2}$ of second shell segment 31B overlaps first end $32_{C,1}$ of third shell segment 31C, and second end $32_{C,2}$ of third shell segment 31C overlaps first end $32_{A,1}$ of first shell segment 31B.

The segmented (e.g., MP35n) shell 30 of neutron shield 20 can be attached to tubular 53 by any means known to those of skill in the art and with the help of this disclosure. For example, bolts can be utilized to hold the shell 30 and/or shell segments 31 in position within logging (e.g., LWD) tool 90; other attachment methods and apparatus are permissible. In embodiments comprising the plurality of shell segments 31, the shell segments 31 can be attached to each other, for example, along ends 32 thereof. For example, second end $32_{A,2}$ of first shell segment 31A can be coupled with (e.g., bolted to) first end $32_{B,1}$ of second shell segment 31B, second end $32_{B,2}$ of second shell segment 31B can be coupled with (e.g., bolted to) first end $32_{C,1}$ of third shell segment 31C, and second end $32_{C,2}$ of third shell segment 31C can be coupled with (e.g., bolted to) first end $32_{A,1}$ of first shell segment 31A. Shell 30 (e.g., single shell segment 31 or "sleeve" or an overlapping attachment of a plurality of segmented shell segments 31) and/or deposition layer 25 deposited thereon can thus provide a thermal neutron shield 20 that completely surrounds the tubular (e.g., drill collar) 53 in the vicinity of (e.g., along the at least the length L1 of) the radiation detector 60.

Although the embodiment of FIG. 1 depicts the inside surfaces (e.g., inside circumferential areas $C_{i,S}$) of shell 30/shell segments 31 coated with deposition material 25 (e.g., boron), deposition material 25 can alternatively or additionally be disposed (e.g., deposited) on outside circumferential area $C_{o,S}$ of shell 30/shell segments 31 along the at least the axial length L1 of gamma ray detector 60 (e.g., along the entirety of axial length L3 of shell 30/shell segments 31) to provide deposition layer or material 25 about the entire outer circumference $C_T$ of the tubular 53 along the at least the axial length L1 of the gamma ray detector 60 (e.g., along the axial length L3 of shell 30/shell segments 31 axially parallel with length L1 of gamma ray detector 60 or along an entirety of axial length L3 of shell 30/shell segments 31). In embodiments, deposition material 25 is not disposed, therefore, on an outer perimeter or circumference 41 of the pressure housing 40.

Particularly in embodiments in which deposition layer 25 is deposited on an outside circumferential area $C_{o,S}$ of shell 30/shell segments 31, a layer of protective material (e.g., fiberglass) can be applied to the outside of the deposition material 25 to mitigate flaking off of the deposition layer. The protective material should be a material, such as, without limitation, fiberglass, which doesn't adversely interfere with the measurement of the logging tool 90.

Shell 30 (e.g., single shell segment or sleeve 31 or an overlapping attachment of a plurality of segmented shell segments 31) can provide a thermal neutron shield 20 that completely surrounds the tubular (e.g., drill collar) 53 in the vicinity of (e.g., along the at least the length L1 of) the gamma ray detector 60. In embodiments, shell 30 and/or the one or the plurality of shell segments 31 thereof can extend an axial length L3 greater than or equal to the length L1 of gamma ray detector 60. Although depicted as a same length as length L4 of deposition material 25 (i.e., length L4 of deposition material 25 is depicted as equal to length L3 of shell 30/shell segments 31 in the embodiment of FIG. 1 and FIG. 2), length L4 of deposition material 25 can be the same as or different from length L3 of shell 30/shell segments 31. For example and without limitation, shell 30 and/or the one or the plurality of shell segments 31 thereof can extend an axial length L3 such that a ratio of the length L3 of shell 30/shell segments 31 to axial length L1 of gamma ray detector 60 (L3/L1) is greater than or equal to 1, 1.1, 1.2, 1.3, 1.4, 1.5, 1.6, 1.7, 1.8, 1.9, or 2, or in a range of from about 1 to about 1.1, 1.2, 1.3, 1.4, 1.5, 1.6, 1.7, 1.8, 1.9, 2, 3, 4, or 5. A distance or length L5 that shell 30/shell segments 31 extends in each direction axially beyond gamma ray detector 60 can be equal to L3/(2L1). In a similar manner, for example and without limitation, deposition layer 25 can extend an axial length L4 such that a ratio of the length L4 of deposition layer 25 to axial length L1 of gamma ray detector 60 (L4/L1) is greater than or equal to 1, 1.1, 1.2, 1.3, 1.4, 1.5, 1.6, 1.7, 1.8, 1.9, or 2, or in a range of from about 1 to about 1.1, 1.2, 1.3, 1.4, 1.5, 1.6, 1.7, 1.8, 1.9, 2, 3, 4, or 5. A distance or length L5 deposition layer 25 extends in each direction axially beyond gamma ray detector 60 can be equal to L4/(2L1).

Because the deposition coating or layer 25 can be applied to the inner surface of a plurality of shell segments 31 to provide shell 30 having deposition layer 25 deposited on an (e.g., entire) inner circumferential area $C_{i,S}$ thereof, a difficulty of coating the inner surface of a single piece cylindrical sleeve 30 can be obviated, in embodiments, by utilizing the plurality of shell segments 31, rather than a single shell segment 31.

The outside surface or circumference $C_T$ of the tubular (e.g., drill collar) 53 and the deposition layer 25 of neutron shield 20 can be in contact or separated to help reduce or prevent fretting or wearing of the deposition material 25 that could cause the deposition material (e.g., boron) to rub or flake away. That is, circumference $C_T$ of the tubular 53 can be less than or substantially equal to an inside circumference of deposition layer 25 or shell 30. Deposition material 25 can be deposited on the entirety of the inside circumferential area $C_{i,S}$ of the shell 30 along the at least the axial length L1 (e.g., along all or a portion (e.g., a corresponding length L1) of length L3 of shell 30).

Detector assembly 10 further comprises pressure housing 40. Pressure housing 40 can comprise the neutron shield 20 or can be distinct from the neutron shield 20. That is, in embodiments, a disparate pressure housing 40 isn't present, and thermal neutron shield 20 provides the pressure housing. In the embodiment of FIG. 1 and FIG. 2, the pressure housing 40 is distinct from the neutron shield 20 and has a smaller cross sectional dimension (e.g., diameter) from that of the neutron shield 20. For example, the average inside diameter D1 of pressure housing 40 can be less than an average inside diameter D2 of neutron shield 20. The material of the pressure housing 40 can comprise any suitable material, for example and without limitation, an alloy of cobalt and nickel (e.g., MP35n), a titanium alloy, and/or a steel alloy, such as Inconel, and can be the same as or different from a material of shell 30, as detailed hereinabove.

By way of example and without limitation, pressure housing 40 can extend an axial length L2 such that a ratio of the length L2 of pressure housing 40 to axial length L1 of gamma ray detector 60 (L2/L1) is greater than or equal to 1, 1.1, 1.2, 1.3, 1.4, 1.5, 1.6, 1.7, 1.8, 1.9, or 2, or in a range of from about 1 to about 1.1, 1.2, 1.3, 1.4, 1.5, 1.6, 1.7, 1.8, 1.9, 2, 3, 4, or 5. A distance or length L7 pressure housing 40 extends in each direction axially beyond gamma ray detector 60 can be equal to L2/(2L1).

Pressure housing 40 can be designed to protect detector 60 from pressures of greater than or equal to about 10,000 psi (68.9 MPa), 20,000 psi (137.9 MPa), 30,000 psi (206.8 MPa), or 35,000 psi (241.3 MPa). In embodiments, pressure housing 40 is not designed for exposure to pressures substantially greater than atmospheric pressure, and can be considered a detector housing. That is, although described as a pressure housing 40, pressure housing 40 can be a detector housing utilized to protect detector 60 from fluid external thereto in a detector assembly 10 designed for lower pressure applications.

Detector assembly 10 further comprises radiation detector 60, which can be a gamma radiation detector. Detector 60 can comprise, for example, a scintillation detector. Such a scintillation detector can comprise a scintillation crystal optically coupled to a photomultiplier tube (PMT). Detector 60 can extend an axial length L1 in a direction parallel to central axis C1 of tubular 53

A detector assembly 10 of this disclosure can further comprise a gamma ray shield 70. Gamma ray shield 70 is operable to reduce an amount of gamma rays produced within the tubular 53 (e.g., drill collar) that reach the detector 60. Gamma ray shield 70 can thus enable azimuthal measurement. Gamma ray shield 70 can be disposed about a portion of an outer perimeter or circumference 41 of the pressure housing 40 adjacent the tubular 53. For example, as depicted in FIG. 1 and FIG. 2, gamma ray shield 70 can extend about half 41A of outer perimeter or circumference 41 of pressure housing 40 along an axial length L6 in a direction parallel to central axis C1 of tubular 53. Although depicted as a same length as length L2 of pressure housing 40 (i.e., length L2 of pressure housing 40 is depicted as equal to length L6 of gamma ray shield 70 in the embodiment of FIG. 1 and FIG. 2), length L6 of gamma ray shield 70 can be the same as or different from length L2 of pressure housing 40. Axial length L6 of gamma ray shield 70 can extend axially a distance L7 beyond axial length L1 of detector 60. For example and without limitation, gamma ray shield 70 can extend an axial length L6 such that a ratio of the length L6 of gamma ray shield 70 to axial length L1 of gamma ray detector 60 (L6/L1) is greater than or equal to 1, 1.1, 1.2, 1.3, 1.4, 1.5, 1.6, 1.7, 1.8, 1.9, or 2, or in a range of from about 1 to about 1.1, 1.2, 1.3, 1.4, 1.5, 1.6, 1.7, 1.8, 1.9, 2, 3, 4, or 5. A distance or length L7 that gamma ray shield 70 extends in each direction axially beyond gamma ray detector 60 can be equal to L6/(2L1).

Gamma ray shield 70 can have a high scatter cross section, and/or a high absorption cross-section. As known to those of skill in the art, the scatter cross section and absorption cross section correlate with density and atomic number, respectively. For example, and without limitation, the gamma ray shield 70 can comprise tungsten, lead, or a combination thereof.

Gamma ray shield 70 can be disposed within a cavity or recess 57 of tubular 53. For example, as depicted in FIG. 1 and FIG. 2, gamma ray shield 70 extends half way around pressure housing 40, which contains detector 60 therein, and gamma ray shield 70, pressure housing 40, and gamma radiation detector 60 are disposed within recess or cavity 57 of tubular 53. Recess or cavity 57 of tubular 53 can comprise a cylindrical portion 58 and/or a rectilinear portion 59 that facilitate positioning of gamma ray shield 70 and pressure housing 40 containing gamma radiation detector 60 therein.

The detector assembly 10 provided herein limits an amount of material overlying detector 60 (e.g., between detector 60 and wellbore 12 or formation 1), and provides a deposition material 25 for mitigation of neutron interactions within the logging (e.g., LWD) tool 90. Via this detector assembly 10, detector 60 is not centralized in the drilling (e.g., LWD) tool 90. Accordingly, the detector assembly 10 provides for reduction or elimination of undesired neutron interactions within the logging (e.g., LWD) tool 90 that could lead to a subpar measurement. The detector 60 of the detector assembly 60 is not centralized and is not in an open cavity with direct line of sight to the formation 1. That is, detector 60 is not along central axis C1 of tubular 53, and neutron shield 20 surrounds tubular 53 (and thus also surrounds pressure housing 40 and detector 60 disposed therein) and extends between detector 60 and wellbore 12/formation 1 external thereto when logging tool 90 is in operation.

A detector assembly 10 of this disclosure can comprise a sensor or detector 60 other than a gamma radiation detector for mineralogy/spectroscopy measurements.

Alternate embodiments can include material changes, such as the material of the tubular 52 (e.g., collar), shell 30/shell segments 31, pressure housing 40, and/or of neutron shield coating 25. The arrangement described with reference to FIG. 1, FIG. 2, and FIG. 3 is exemplary, and not intended to be limiting. For example, in alternate embodiments, the detector 60 and detector assembly 10 can be arranged differently within the logging tool 90, the neutron shield 20 can be attached differently (e.g., a one piece sleeve design for shell 30), and/or the neutron shield coating 25 can be applied/deposited to the outside surface or outside circumferential area $C_{o,S}$ of the shell 30/shell segments 31.

Also disclosed herein is a logging tool 90 comprising the detector assembly 10. The logging tool 90 can be a drilling tool 90A (e.g., an LWD tool) conveyable into the wellbore 12 via a drill string 18, or a wireline tool 90B conveyable into the wellbore 12 via a logging cable 11 (e.g., a wireline). In applications, a drilling (e.g., an LWD) tool 90A of this disclosure can comprise detector assembly 10 and tubular 53, wherein the tubular 53 is a drill collar that defines a fluid flow path 52 along an axial length L8 of the drill collar 53 or tool 90. Drill collar 53 can comprise any material known to those of skill in the art, for example, without limitation, steel, nickel, an alloy thereof, or a combination thereof. Fluid flow path 52 can be offset from the central axis C1 of tubular 53. That is, with reference back to FIG. 2, central axis C2 of fluid flow path 52 can be offset from central axis C1 of tubular 53.

Logging tool 90 can further comprise other components. For example, a neutron source 55 can be axially spaced from detector 60 and/or detector assembly 10, and disposed within logging tool 90, or disposed in another (e.g., an adjacent) tubular or drill collar 53. For example, with reference to FIG. 1, neutron source 55 can be out of the plane, toward or away from the viewer. Neutron source 55 can be disposed within logging tool 90 as known to those of skill in the art and with the help of this disclosure, for example, as depicted in FIG. 2, within tubular 53 an axial distance away from shell 30/shell segments 31. Neutron source 55 can comprise an isotopic (e.g., chemical) neutron source or a pulsed neutron generator source.

During operation, neutron source 55 can constantly or intermittently (e.g., in a pulsed manner) emit neutrons which pass through specified vectors and are blocked by shielding in other directions. The neutrons are absorbed by the matter comprising the formation 1 which results in high energy gamma ray emission. The gamma rays "reflect" in vectors toward the gamma ray detector 60 of detector assembly 10, which, as depicted in FIG. 2, is located in a different location in the logging (e.g., LWD) tool 90. Neutrons that are not absorbed may also reflect back toward the logging (e.g., LWD) tool 90. The detector 60 is located within pressure housing 40. Internal gamma ray shield 70 (e.g., comprising tungsten) inhibits gamma rays from certain vectors, making logging (e.g., LWD) tool 90 mostly sensitive to gamma rays only from vectors opposite from the internal gamma ray shield 70. This enables measurement of high energy gamma rays due to neutron absorption in the formation 1 in only certain directions (e.g., allows for azimuthal measurement) and de-sensitizes the logging (e.g., LWD) tool 90 to low energy natural gamma rays originating from other directions in the wellbore (e.g., borehole) 12.

The pressure housing 40 is made high yield strength material (e.g., MP35n), which provides resistance to borehole pressure. The material of pressure housing 40 and neutron shield 20 (e.g., shell 30 and/or segments 31 thereof) desirably comprises constituent elements (e.g., elements of MP35n alloy, primarily cobalt and nickel) that are generally not present in the formations 1 to be evaluated as are other elements used in other alloys used in logging tool 90. Therefore, any neutron absorption (from aforementioned reflected neutrons) and subsequent gamma ray emission from within logging tool 90 followed by a gamma ray absorption in the gamma ray detector 60 can be reasonably separated from the gamma rays corresponding to different elements in the formation 1, as such gamma rays can be of lower energy than the high energy formation produced gamma radiation. Deposition layer 25 of neutron shield 20 comprises a deposition material such as, without limitation, boron, which has a high thermal neutron capture cross-section. The neutron capture cross section is an intrinsic property of the material, unrelated to the macro-scale geometry of the deposition layer. Accordingly, the deposition layer 25 can absorb many of the neutrons entering the logging tool 90 while producing low-energy gamma rays that do not interfere with the high energies of important formation 1 neutron-induced gamma rays. In addition, the deposition layer 25 and shell 30/shell segments 31 desirably do not substantially block incoming gamma rays from the formation 1.

Neutrons pass through the shell material of shell 30/shell segments 31 (e.g., MP35n). Any neutrons that are absorbed by the shell 30/shell segments 31 will produce gamma rays that have energies different from neutron-induced gamma rays produced in the formation 1, and thus can be discriminated from the formation measurement because of their disparate characteristics. Most of the neutrons that pass through the shell 30/shell segments 31 can be absorbed by the deposition layer (e.g., boron coating) 25 on the inside surface (e.g., inside circumferential area $C_o$) of the shell 30/shell segments 31, thus greatly reducing the production of gamma rays from within the tubular (e.g., drill collar) 53. As noted hereinabove, this is desirable, as the underlying material of tubular (e.g., drill collar) 53 may be a steel or nickel alloy that contains important elements common to the formation 1. The optional (e.g., tungsten) gamma ray shield 70 on the backside of the detector 60 can help to reduce the number of gamma rays produced by neutron reactions with the tubular (e.g., collar) 53 that can reach the detector 60. This gamma ray shielding provided by gamma ray shield 70 can also produce "favorable" and "unfavorable" gamma ray absorption vectors which provide the instrument/logging tool 90 with azimuthal measurement capability. Over time, the deposition layer (e.g., boron coating) 25 on the inside surface of the shell 30/shell segments 31 may rub or flake away. In embodiments of this disclosure, because of the segmentation of the shell 30, individual shell segments 31 can be relatively inexpensively repaired or replaced to provide for optimum measurement performance of a logging tool 90 comprising a detector assembly 10 comprising the segmented shell 30.

The neutron shield 20 (i.e., shell 30 comprising one or more shell segments 31 and deposition layer 25) blocks a majority of the incoming neutrons which results in the emission of gamma rays of energy levels different than energy levels of formation gamma rays resulting from neutron absorption in the formation 1, and therefore provide that incoming neutrons will not hinder the measurement of interest (i.e., property(ies) of the formation 1).

The logging tool 90 comprising the detector assembly 10 of this disclosure can be a logging while drilling tool 90A (e.g., a LWD or MWD tool) conveyable into a wellbore 12 by a drill string 18 or a wireline tool 90B conveyable into the wellbore 12 via a logging cable 11 (e.g., a wireline cable), as depicted in FIG. 4A and FIG. 4B, respectively. FIG. 4A is a schematic view of a subsurface formation 1 penetrated by a wellbore 12 in which a logging tool 90 of this disclosure (e.g., a drilling tool 90A) can be positioned via a drill string 18. Drill string 18 comprises a conveyance 20 and a bottom hole assembly (BHA) 80. BHA 80 comprises a drill bit 82 having ports 83, and further comprises one or more sections or subassemblies 81, with five sections or subassemblies 81A, 81B, 81C, 81D, and 81E depicted in FIG. 4A. One or more of the sections or subassemblies 81 can comprise a drilling tool 90A comprising a detector assembly 10 of this disclosure. BHA 80 can comprise one or more MWD sections, subassemblies or downhole tools operable to provide an MWD measurement selected from direction, inclination, survey data, downhole pressure (inside and/or outside drill pipe), resistivity, density, and/or porosity. For example, BHA 80 can comprise a section or subassembly 81 that can be an MWD subassembly configured for measuring direction and/or orientation; a section or subassembly 81 that can be an MWD subassembly configured for measuring pressure; a section or subassembly 81 that can be an MWD subassembly configured for measuring resistivity; and/or a section or subassembly 81 that can be an MWD subassembly configured for measuring density and/or porosity, for example, via gamma ray technology. BHA 80 can further comprise one or more sections or subassemblies comprising processors or apparatus for providing telemetry of data from one or more of the other sections or subassemblies to surface 5. For example, a telemetry section or subassembly 81 can comprise a mud pulser. In embodiments, BHA 80 comprises one or more LWD sections, subassemblies or downhole tools, such as an LWD section 81 comprising a formation tester configured for taking one or more formation samples, for example, for further analysis after transport uphole. According to this disclosure, one or more sections or subassemblies 81 of BHA 80 can comprise a downhole tool 90A comprising a detector assembly 10 as detailed herein. The arrangement and components of subassemblies 81 described with reference to FIG. 4A is intended to be exemplary, rather than exhaustive, and other components/sections/subassemblies of a BHA and arrangements thereof can be included in a BHA 80, provided the BHA 80 comprises a drilling tool 90A comprising a detector assembly 10, as described herein.

FIG. 4B is a schematic view of a subsurface formation 1 penetrated by a wellbore 12 in which a wireline tool 90 of this disclosure (e.g., a wireline tool 90B) can be positioned via a wireline cable 11. Wireline tool 90B comprises a detector assembly 10, as described herein.

As best depicted in FIG. 4A, the logging tool 50 can comprise one or more additional drill collars. For example, in FIG. 4A, section 81A may comprise a drilling tool 90A of this disclosure, having an outer diameter $D_A$. One or more sections or subassemblies 81B, 81C, 81D, and/or 81E can comprise a drill collar having an outer diameter $D_B$, $D_C$, $D_D$, $D_E$, respectively. The outer diameter $D_A$ of the logging tool 90A of this disclosure along an axial length L8 thereof can be within at least 30, 25, or 25% of an outer diameter of each of the one or more additional drill collars.

According to embodiments, a logging tool 90 for placement within a wellbore 12 penetrating a subterranean formation 1 comprises: a detector assembly 10 disposed about a tubular 53, wherein the tubular 53 comprises a drill collar that defines a substantially cylindrical fluid flow path 52 along an axial length L8 of the drill collar, wherein the tubular 53 has a central axis C1 along a length L8 thereof, and wherein the fluid flow path 52 is offset from the central axis C1 of tubular 53. The detector assembly 10 can be a detector assembly as detailed hereinabove. For example, the detector assembly can comprise: a gamma radiation detector 60 disposed within a pressure housing 40, wherein the gamma radiation detector 60 is offset from the central axis C1 and extends an axial length L1 in a direction parallel to the central axis C1 of the tubular 53, and wherein the pressure housing 40 is substantially cylindrical and has an outer circumference or perimeter 41; a neutron shield 20 disposed about a portion or entirety of circumference $C_T$ of the tubular 52 along at least the axial length L1 of the gamma radiation detector 60, wherein the neutron shield 20 reduces an amount of neutrons that pass from the wellbore 12 and/or the formation 1 through the tubular 53 during operation of the detector assembly 10, while allowing transmission of gamma rays therethrough to the gamma radiation detector 60, wherein the neutron shield 20 comprises three shell segments 31 (e.g., first shell segment 31A, second shell segment 31B, and third shell segment 31C) and a deposition material or layer 25 deposited on each of the three shell segments 31, wherein each of the three shell segments 31 is comprised of a shell material, wherein the shell material comprises a material having a yield strength sufficient for use in the wellbore 12 and comprising one or more elements, wherein a concentration of the one or more elements each or in combination comprise less than a concentration of the each or the combination of the one or more elements in the subterranean formation 1, wherein the three shell segments 31 overlap along ends 32 thereof to provide a shell 30 about the entire circumference $C_T$ of the tubular 53 along the at least the axial length L1 of the gamma radiation detector 60, and wherein the deposition material 25 is capable of absorbing neutrons from the wellbore 12 and producing gamma rays having a lower energy than neutron-induced gamma rays produced in the formation 1; and a gamma ray shield 70 disposed about an interior half 41A of the outer circumference or perimeter 41 of the pressure housing 40 that contacts the drill collar 53 and along at least an axial length L1 of the gamma radiation detector 60, wherein the gamma ray shield 70 reduces an amount of gamma rays produced within the drill collar 53 that reach the gamma radiation detector 60, and enables azimuthal measurement, wherein the gamma ray shield 70 comprises a coating and/or a cylindrical half-shell size to receive the outer circumference or perimeter 41 of the pressure housing 40. The components of the logging tool can be any described hereinabove or as known to those of skill in the art and with the help of this disclosure. For example, the deposition material 25 can have a high thermal neutron capture cross section, wherein a high thermal neutron capture cross section is defined as a thermal neutron capture cross section of greater than or equal to about 750 barns/cm$^2$.

Also disclosed herein is a method of measuring a property of material in a subterranean formation 1 penetrated by a wellbore 12. Such a method will now be described with reference to FIG. 5, which is a flowchart of a method 100 of measuring a property of a material in a subterranean formation via the logging (e.g., LWD) tool of this disclosure. Method 100 comprises: placing in the wellbore 12 of a subterranean formation 1 a detector assembly 10 of this disclosure (e.g., the detector assembly comprising a detector 60 disposed within a pressure housing 40, and having an axial length L1 in a direction parallel to a central axis C1 of tubular 53) disposed about a tubular 53 at step 101, and shielding thermal neutrons from detector 60 of detector assembly 10 while operating the detector 60 to obtain a measure of a property of the subterranean formation 1.

Figure 5:
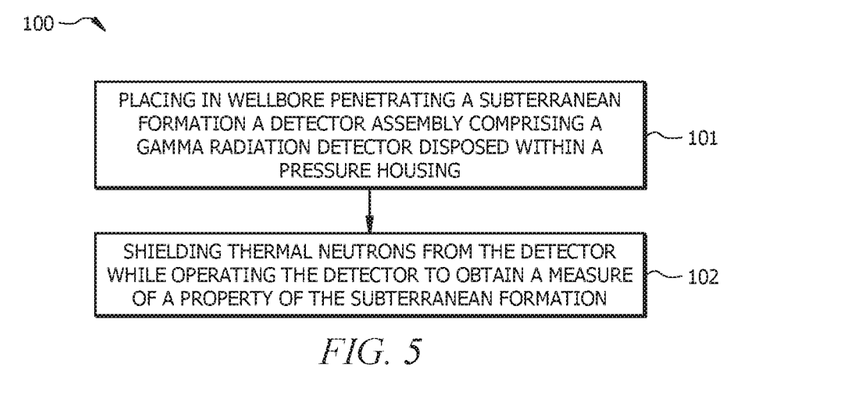
FIG. 5 is a flowchart of a method of measuring a property of a material in a subterranean formation via the logging tool of this disclosure.

Shielding of the thermal neutrons from the detector at 102 can comprise providing a neutron shield 20 disposed about a portion or an entirety of a circumference $C_T$ of the tubular 53 along at least the axial length L1 of the detector 60, wherein the neutron shield 20 reduces an amount of neutrons that passes from the wellbore 12 and/or the formation 1 through the tubular 53 during operation of the detector assembly 10, while allowing transmission of gamma rays therethrough (e.g., through neutron shield 20) to the detector

60. Neutron shield 20 can be as described hereinabove. For example, neutron shield 20 can comprise a shell 30 of a shell material, wherein the shell material comprises a material having a yield strength sufficient for use in the wellbore 12 and/or comprising one or more elements, wherein a density of each or a combination of the one or more elements in the shell 30 is less than a density of each or the combination of the one or more elements in the earthen formation 1. The yield strength can be, for example and without limitation, greater than or equal to 200,000 psi (1379 MPa). As detailed hereinabove, the neutron shield 20 can further comprise a deposition material or layer 25 deposited on the shell 30, wherein the deposition material 25 is capable of absorbing neutrons from the wellbore 12 and producing gamma rays having a lower energy than neutron-induced gamma rays produced in the formation 1. The deposition material 25 an have a high thermal neutron capture cross section, wherein a high thermal neutron capture cross section is defined as a thermal neutron capture cross section of greater than or equal to about 750 barns/cm$^2$.

In embodiments, as noted hereinabove, the tubular 53 can comprise a drill collar, the logging tool 90 can comprise a drilling (e.g., LWD) tool 90A, and placing the detector assembly 10 in the wellbore 12 can comprise conveying the drill collar 53 into the wellbore 12 via a drill string 18. Alternatively, the logging tool 90 can comprise a wireline tool 90B, and placing the detector assembly 10 in the wellbore 12 can comprise conveying the wireline tool 90B into the wellbore 12 via a logging (e.g., wireline) cable 11.

A method of measuring a property of material in a subterranean formation 1 penetrated by a wellbore 12 can comprise: placing, in the wellbore 12, a logging tool 90 (e.g., a drilling (LWD) tool 90A or a wireline tool 90B) as described herein; and measuring at least one property of the subterranean formation 1 with the logging tool 90. As noted above, the logging tool 90 can be a drilling (e.g., LWD) tool 90A, and placing the logging tool 90 in the wellbore 12 can further comprise conveying the drilling tool 90A into the wellbore 12 by a drill string 18. The property of the subterranean formation 1 measured with the logging tool 90 can comprise a mineralogy interpretation of the formation.

Measuring the property can comprise a wellbore elemental composition measurement technique comprising irradiating the formation 1 with the source 55 of neutrons disposed within logging tool 90 conveyed within wellbore 12, and measuring the energy and intensity of induced gamma radiation using gamma radiation detector 60 disposed within the logging tool 90. If an isotopic or 'chemical' source (e.g., of americium (Am) and beryllium (Be)) is utilized, a majority of the measured gamma radiation can be a result of the capture of thermal neutrons by elements in the formation 1 and wellbore 12 environment. Upon capture of thermal neutrons, individual nuclei emit gamma radiation at characteristic energies and characteristic relative intensities. A measure of the energy and relative intensity of capture radiation (e.g., a capture gamma ray "spectrum") can be utilized to identify the presence of particular elements. A measure of the intensity of the spectrum from a given element can be utilized to determine the concentration of the given element. Ratios of characteristic energies can be indicative of relative concentrations of elements.

Those of ordinary skill in the art will readily appreciate various benefits that may be realized by the present disclosure. The herein disclosed gamma ray detector assembly 10 can be utilized in a gamma detector assembly portion 90A of an LWD MS tool 90 in combination with a source/emitter 55 portion of the LWD MS tool. As detailed herein, the detector assembly portion 90A of the logging (e.g., LWD MS) tool 90 of this disclosure combines materials, coatings, and geometries that can mitigate neutron capture and subsequent gamma ray emission within the logging (e.g., LWD) tool 90 itself while allowing gamma rays from the formation to reach the gamma ray scintillator. The detector assembly 10 and logging (e.g., LWD) tool 90 comprising same provide for a reduced amount of unwanted collar material of insufficient neutron shielding between the formation 1 and the detector 60 relative to conventional logging (e.g., LWD) tools, and thus enhances signal quality obtained with the herein disclosed logging (e.g., LWD) tool 90. The solution provided herein is mechanically robust and cost effective.

As detailed herein, the shell 30 can be segmented so that the individual shell segments 31 can be formed from smaller raw material billets than would be required to manufacture larger pieces or a single "sleeve" shell 30, thus avoiding supply issues for larger raw materials. The shell 30 and/or shell segment(s) 31 thereof can attach radially onto the tubular (e.g., collar) 53. Multi-piece installation of shell 30 provided via the use of a plurality of shell segments 31 can facilitate manufacture of logging (e.g., LWD) tool 90 and can also provide a simpler design whereby other sections of the logging (e.g., LWD) tool 90 do not require a reduced diameter to accommodate a one piece sleeve shell 30. Because the deposition coating 25 can be applied to the inner surface of a plurality of shell segments 31 to provide shell 30 having deposition layer 25 deposited on an inner circumferential area $C_{i,S}$ thereof, a difficulty of coating the inner surface of a single piece cylindrical sleeve 30 can be obviated, in embodiments.

Shell 30 (e.g., single shell segment or sleeve or an overlapping attachment of a plurality of segmented shell segments 31) can provide a thermal neutron shield 20 that completely surrounds the tubular (e.g., drill collar) 53 in the vicinity of the gamma ray detector 60.

The detector assembly 10 provided herein limits an amount of material overlying detector 60 (e.g., between detector 60 and wellbore 12 and formation 1), and provides a deposition material 25 for mitigation of neutron interactions within the logging (e.g., LWD) tool 90. Via this detector assembly 10, detector 60 is not centralized in the drilling (e.g., LWD) tool 90, and undesired neutron interactions within the tool 90 that could lead to a subpar measurement are reduced or eliminated. The detector 60 of the detector assembly 10 described herein is not centralized, and is not in an open cavity with direct line of sight to the formation 1.

By providing neutron shielding via neutron shield 20 to prevent neutron capture and corresponding gamma ray emission within the logging (e.g., LWD) tool 90 described herein, a superior measurement can thus be obtained via the logging tool 90 of this disclosure.

As noted hereinabove, materials suitable for use in the pressure housing 40 and shell 30/shell segments 31 must having outstanding mechanical properties and desirably share little in common with the measured elements in the formation 1. Materials providing such dual benefits, such as MP35n material, can be expensive and may be available in limited sizes from vendors. The herein disclosed detector assembly 10 provides for the use of shell segments 31, thus reducing a size for a single piece of suitable material for shell 30 and facilitating replacement of shell 30/shell segments 31.

Accordingly, a logging (e.g., LWD) tool 90 of this disclosure can: (1) provide appropriate thermal neutron shielding and minimizes formation gamma ray attenuation; (2)

address size and cost limitations of shell 30/shell segments 31; (3) address potential flaking of deposition material (e.g., boron coating) 25 that could result from contact with fluid (e.g., drilling fluid) present in the wellbore 12, with the wellbore wall 7, and/or with drill bit 82 cuttings; and/or (4) provide adequate mechanical integrity to the logging tool 90 to handle environmental and/or drilling loads, such as pressure, torque, weight-on-bit, and bending of the tubular (e.g., drilling collar) 53.

Additional Disclosure

The following are non-limiting, specific embodiments in accordance with the present disclosure:

Embodiment A: A detector assembly disposed about a tubular for placement within a wellbore penetrating a subterranean formation, the detector assembly comprising: a gamma radiation detector disposed within a pressure housing, wherein the detector extends an axial length in a direction parallel to a central axis of the tubular; and a neutron shield disposed about a circumference of the tubular along at least the axial length of the detector, wherein the neutron shield reduces an amount of neutrons that pass from the wellbore and/or the formation through the tubular during operation of the detector assembly, while allowing transmission of gamma rays therethrough to the detector.

Embodiment B: The detector assembly of Embodiment A, wherein the neutron shield further comprises a shell comprised of a shell material, wherein the shell material comprises a material having a yield strength sufficient for use in the wellbore and comprising one or more elements, wherein a density of each or a combination of the one or more elements in the shell is less than a density of each or the combination of the one or more elements in the earthen formation.

Embodiment C: The detector assembly Embodiment B, wherein the yield strength is greater than or equal to 200,000 psi (1379 MPa).

Embodiment D: The detector assembly of Embodiment B or Embodiment C, wherein a concentration or density of the one or more elements each or in combination comprise less than concentration or density of each or the combination of the one or more elements in the subterranean formation.

Embodiment E: The detector assembly of any of Embodiment B to Embodiment D, wherein the shell has an average radial thickness in a range of from about 0.25 inch (0.64 cm) to about 0.35 inch (0.89 cm).

Embodiment F: The detector assembly of any of Embodiment B to Embodiment E, wherein the pressure housing and/or the shell material comprises an alloy of cobalt and nickel (e.g., MP35n).

Embodiment G: The detector assembly of any of Embodiment B to Embodiment F, wherein the shell comprises a single shell segment or a plurality of shell segments positioned to provide the shell about the entire circumference of the tubular along the at least the axial length of the detector.

Embodiment H: The detector assembly of Embodiment G, wherein the shell comprises the single shell segment, and wherein the single shell segment comprises a sleeve.

Embodiment I: The detector assembly of Embodiment G or Embodiment H, wherein the shell comprises the plurality of shell segments.

Embodiment J: The detector assembly of any of Embodiment G to Embodiment I, wherein the neutron shield further comprises a deposition material deposited on the single shell segment or on each of the plurality of shell segments, wherein the deposition material is capable of absorbing neutrons from the wellbore and producing gamma rays having a lower energy than neutron-induced gamma rays produced in the subterranean formation.

Embodiment K: The detector assembly of Embodiment J, wherein the deposition material has a high thermal neutron capture cross section, wherein a high thermal neutron capture cross section is defined as a thermal neutron capture cross section of greater than or equal to about 750 barns/cm$^2$.

Embodiment L: The detector assembly of Embodiment J or Embodiment K, wherein the deposition material is deposited on the single shell segment or on each of the plurality of shell segments such that an entirety of an inside circumferential area and/or an entirety of an outside circumferential area of the shell along the at least the axial length has the deposition material deposited thereon.

Embodiment M: The detector assembly of any of Embodiment G to Embodiment L, wherein the shell comprises the plurality of shell segments, wherein the plurality of shell segments overlap along ends thereof when positioned to provide the shell about the entire circumference of the tubular along the at least the axial length of the detector.

Embodiment N: The detector assembly of Embodiment B, wherein the neutron shield further comprises a deposition material deposited on the shell, wherein the deposition material is capable of absorbing neutrons from the wellbore and producing gamma rays having a lower energy than neutron-induced gamma rays produced in the formation.

Embodiment O: The detector assembly of Embodiment N, wherein the deposition material has a high thermal neutron capture cross section, wherein a high thermal neutron capture cross section is defined as a thermal neutron capture cross section of greater than or equal to about 750 barns/cm$^2$.

Embodiment P: The detector assembly of Embodiment N or Embodiment 0, wherein the deposition material is deposited on an entirety of an inside circumferential area and/or an entirety of an outside circumferential area of the shell along the at least the axial length.

Embodiment Q: The detector assembly of Embodiment P: wherein the deposition material is deposited on the entirety of the inside circumferential area of the shell along the at least the axial length.

Embodiment R: The detector assembly of any of Embodiment N to Embodiment Q, wherein the deposition material comprises boron, cadmium, or a combination thereof.

Embodiment S: The detector assembly of Embodiment R, wherein the deposition material comprises boron carbide.

Embodiment T: The detector assembly of any of Embodiment N to Embodiment S, wherein the deposition material has a radial thickness in a range of from about 0.050 inch (1.3 mm) to about 0.10 inch (2.5 mm).

Embodiment U: The detector assembly of any of Embodiment A to Embodiment T, wherein the tubular is a drill collar.

Embodiment V: The detector assembly of any of Embodiment A to Embodiment U, wherein the pressure housing comprises the neutron shield or is distinct from the neutron shield.

Embodiment W: The detector assembly of any of Embodiment A to Embodiment V, wherein the pressure housing is distinct from the neutron shield and has a smaller cross sectional dimension (e.g., diameter) from that of the neutron shield.

Embodiment X: The detector assembly of any of Embodiment A to Embodiment W, wherein the detector comprises a scintillation detector.

Embodiment Y: The detector assembly of Embodiment X, wherein the scintillation detector comprises a scintillation crystal optically coupled to a photomultiplier tube (PMT).

Embodiment Z1: The detector assembly of any of Embodiment A to Embodiment Y further comprising a gamma ray shield disposed about a portion of an outer perimeter of the pressure housing adjacent the tubular, wherein the gamma ray shield reduces an amount of gamma rays produced within the drill collar that reach the detector, and enables azimuthal measurement.

Embodiment Z2: The detector assembly of Embodiment Z1, wherein the gamma ray shield has a high scatter cross section, and a high absorption cross-section.

Embodiment Z3: The detector assembly of Embodiment Z1 or Embodiment Z2, wherein the gamma ray shield comprises tungsten, lead, or a combination thereof.

Embodiment Z4: A logging tool comprising the detector assembly of any of Embodiment A to Embodiment Z3 and the tubular, wherein the tubular comprises a drill collar, and wherein the drill collar defines a fluid flow path along an axial length of the drill collar.

Embodiment Z5: The logging tool of Embodiment Z4, wherein the drill collar comprises steel, nickel, an alloy thereof, or a combination thereof.

Embodiment Z6: The logging tool of Embodiment Z4 or Embodiment Z5 further comprising a neutron source disposed within the or another drill collar and axially spaced from the detector assembly.

Embodiment Z7: The logging tool of Embodiment Z6, wherein the neutron source comprises an isotopic neutron source or a pulsed neutron generator source.

Embodiment Z8: The logging tool of any of Embodiment Z4 to Embodiment Z7, wherein the drill collar is conveyable into the wellbore via a drill string.

Embodiment Z9: The logging tool of any of Embodiment Z4 to Embodiment Z8, wherein the fluid flow path is offset from the central axis.

Embodiment Z10: The logging tool of any of Embodiment Z4 to Embodiment Z9, further comprising one or more additional drill collars, wherein an outer diameter of the drill collar is within at least 10, 15, 20, or 25% of an outer diameter of each of the one or more additional drill collars.

Embodiment Z11: A method of measuring a property of material in a subterranean formation penetrated by a wellbore, the method comprising: placing in the wellbore a detector assembly disposed about a tubular, the detector assembly comprising: a gamma radiation detector disposed within a pressure housing, wherein the detector has an axial length in a direction parallel to a central axis of the tubular; and shielding thermal neutrons from the detector while operating the detector to obtain a measure of a property of the subterranean formation.

Embodiment Z12: The method of Embodiment Z11, wherein the shielding of the thermal neutrons from the detector comprises providing a neutron shield disposed about a circumference of the tubular along at least the axial length of the detector, wherein the neutron shield reduces an amount of neutrons that passes from the wellbore and/or the formation through the tubular during operation of the detector assembly, while allowing transmission of gamma rays therethrough to the detector.

Embodiment Z13: The method of Embodiment Z12, wherein the neutron shield further comprises a shell of a shell material, wherein the shell material comprises a material having a yield strength sufficient for use in the wellbore and comprising one or more elements, wherein a density of each or a combination of the one or more elements in the shell is less than a density of each or the combination of the one or more elements in the earthen formation.

Embodiment Z14: The method of Embodiment Z13, wherein the yield strength is greater than or equal to 200,000 psi (1379 MPa).

Embodiment Z15: The method of Embodiment Z13 or Embodiment Z14, wherein the density of the one or more elements each or in combination comprise less than the density of each or the combination of the one or more elements in the subterranean formation.

Embodiment Z16: The method of any of Embodiment Z13 to Embodiment Z15, wherein the neutron shield further comprises a deposition material deposited on the shell, wherein the deposition material is capable of absorbing neutrons from the wellbore and producing gamma rays having a lower energy than neutron-induced gamma rays produced in the formation.

Embodiment Z17: The method of Embodiment Z16, wherein the deposition material has a high thermal neutron capture cross section, wherein a high thermal neutron capture cross section is defined as a thermal neutron capture cross section of greater than or equal to about 750 barns/$cm^2$.

Embodiment Z18: The method of any of Embodiment Z11 to Embodiment Z17, wherein the tubular comprises a drill collar.

Embodiment Z19: The method of Embodiment Z18, wherein disposing the detector assembly in the wellbore further comprises conveying the drill collar into the wellbore via a drill string.

Embodiment Z20: A method of measuring a property of material in a subterranean formation penetrated by a wellbore, the method comprising: placing, in the wellbore, the logging tool of any of Embodiment Z4 to Embodiment Z10; and measuring at least one property of the subterranean formation with the logging tool.

Embodiment Z21: The method of Embodiment Z20, wherein placing the logging tool in the wellbore further comprises conveying a logging tool into the wellbore by a drill string.

Embodiment Z22: The method of Embodiment Z21, wherein the property comprises a mineralogy indication of the formation.

Embodiment Z23: A logging tool for placement within a wellbore penetrating a subterranean formation, the logging tool comprising: a detector assembly disposed about a tubular, wherein the tubular comprises a drill collar that defines a substantially cylindrical fluid flow path along an axial length of the drill collar, wherein the tubular has a central axis along a length thereof, and wherein the fluid flow path is offset from the central axis, and wherein the detector assembly comprises: a gamma radiation detector disposed within a pressure housing, wherein the gamma radiation detector is offset from the central axis and extends an axial length in a direction parallel to the central axis of the tubular, and wherein the pressure housing is substantially cylindrical and has an outer circumference; a neutron shield disposed about an entire circumference of the tubular along at least the axial length of the gamma radiation detector, wherein the neutron shield reduces an amount of neutrons that pass from the wellbore and/or the formation through the tubular during operation of the detector assembly, while allowing transmission of gamma rays therethrough to the gamma radiation detector, wherein the neutron shield comprises three shell segments and a deposition material deposited on each of the three shell segments, wherein each of the three shell segments is comprised of a shell material, wherein the shell material comprises a material having a yield strength sufficient for use in the wellbore and comprising one or more elements, wherein a concentration of the one or more elements each or in combination is less than a concentration of the each or the combination of the one or more elements in the subterranean formation, wherein the three shell segments overlap along ends thereof to provide a shell about the entire circumference of the tubular along the at least the axial length of the gamma radiation detector, and wherein the deposition material is capable of absorbing neutrons from the wellbore and producing gamma rays having a lower energy than neutron-induced gamma rays produced in the formation; and a gamma ray shield disposed about an interior half of the outer circumference of the pressure housing that contacts the drill collar and along at least an axial length of the gamma radiation detector, wherein the gamma ray shield reduces an amount of gamma rays produced within the drill collar that reach the gamma radiation detector, and enables azimuthal measurement, wherein the gammy ray shield comprises a coating and/or a cylindrical half-shell size to receive the outer circumference of the pressure housing.

Embodiment Z24: The logging tool of Embodiment Z23, wherein the deposition material has a high thermal neutron capture cross section, wherein a high thermal neutron capture cross section is defined as a thermal neutron capture cross section of greater than or equal to about 750 barns/cm$^2$.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

I claim:

1. A detector assembly disposed about a tubular for placement within a wellbore penetrating a subterranean formation, the detector assembly comprising:
a gamma radiation detector disposed within a pressure housing, wherein the detector extends an axial length in a direction parallel to a central axis of the tubular; and
a neutron shield disposed about a circumference of the tubular along at least the axial length of the detector, wherein the neutron shield reduces an amount of neutrons that pass from the wellbore and/or the formation through the tubular during operation of the detector assembly, while allowing transmission of gamma rays therethrough to the detector, wherein the neutron shield further comprises a shell comprised of a shell material, wherein the shell material comprises a material having a yield strength sufficient for use in the wellbore, wherein the shell comprises a plurality of shell segments positioned to provide the shell about the entire circumference of the tubular along the at least the axial length of the detector, and wherein the plurality of shell segments overlap along ends thereof when positioned to provide the shell about the entire circumference of the tubular along the at least the axial length of the detector.

2. The detector assembly of claim 1, wherein a density of each or a combination of one or more elements in the shell is less than a density of each or the combination of the one or more elements in the earthen formation.

3. The detector assembly of claim 2, wherein the neutron shield further comprises a deposition material deposited on the shell, wherein the deposition material is capable of absorbing neutrons from the wellbore and producing gamma rays having a lower energy than neutron-induced gamma rays produced in the formation.

4. The detector assembly of claim 3, wherein the deposition material is deposited on an entirety of an inside circumferential area and/or an entirety of an outside circumferential area of the shell along the at least the axial length.

5. The detector assembly of claim 4, wherein the deposition material is deposited on the entirety of the inside circumferential area of the shell along the at least the axial length.

6. The detector assembly of claim 1, wherein the neutron shield further comprises a deposition material deposited on a single shell segment or on each of the plurality of shell segments, wherein the deposition material is capable of absorbing neutrons from the wellbore and producing gamma rays having a lower energy than neutron-induced gamma rays produced in the subterranean formation.

7. The detector assembly of claim 6, wherein the deposition material is deposited on each of the plurality of shell segments such that an entirety of an inside circumferential area and/or an entirety of an outside circumferential area of the shell along the at least the axial length has the deposition material deposited thereon.

8. The detector assembly of claim 1:
wherein the tubular is a drill collar; and/or wherein the pressure housing comprises the neutron shield or is distinct from the neutron shield.

9. The detector assembly of claim 8, wherein the pressure housing is distinct from the neutron shield and has a smaller cross sectional dimension from that of the neutron shield.

10. The detector assembly of claim 1 further comprising a gamma ray shield disposed about a portion of an outer perimeter of the pressure housing adjacent the tubular, wherein the gamma ray shield reduces an amount of gamma rays produced within the drill collar that reach the detector, and enables azimuthal measurement.

11. A logging tool comprising the detector assembly of claim 1 and the tubular, wherein the tubular comprises a drill collar, and wherein the drill collar defines a fluid flow path along an axial length of the drill collar.

12. The logging tool of claim 11, wherein the neutron shield further comprises a shell comprised of a shell material, wherein the shell material comprises a material having a yield strength sufficient for use in the wellbore, and wherein the shell comprises a single shell segment about the entire circumference of the tubular along the at least the axial length of the gamma radiation detector.

13. The logging tool of claim 11 further comprising a neutron source disposed within the or another drill collar and axially spaced from the detector assembly, and optionally wherein the neutron source comprises an isotopic neutron source or a pulsed neutron generator source.

14. A method of measuring a property of material in a subterranean formation penetrated by a wellbore, the method comprising:
placing, in the wellbore, the tool of logging tool of claim 11; and
measuring at least one property of the subterranean formation with the logging tool.

15. A logging tool comprising a detector assembly and a tubular, wherein the detector assembly is disposed about the tubular for placement within a wellbore penetrating a subterranean formation, wherein the detector assembly comprises:
a gamma radiation detector disposed within a pressure housing, wherein the gamma radiation detector extends an axial length in a direction parallel to a central axis of the tubular; and
a neutron shield disposed about a circumference of the tubular along at least the axial length of the gamma radiation detector, wherein the neutron shield reduces an amount of neutrons that pass from the wellbore and/or the formation through the tubular during operation of the detector assembly, while allowing transmission of gamma rays therethrough to the gamma radiation detector,
wherein the tubular comprises a drill collar, and wherein the drill collar defines a fluid flow path along an axial length of the drill collar wherein the fluid flow path is offset from the central axis of the tubular.

16. The logging tool of claim 15, wherein the detector assembly further comprises a gamma ray shield disposed about a portion of an outer perimeter of the pressure housing adjacent the tubular, wherein the gamma ray shield reduces an amount of gamma rays produced within the tubular that reach the gamma radiation detector, and enables azimuthal measurement.

17. A method of measuring a property of material in a subterranean formation penetrated by a wellbore, the method comprising:
placing in the wellbore a detector assembly disposed about a tubular, the detector assembly comprising:
a gamma radiation detector disposed within a pressure housing, wherein the gamma radiation detector has an axial length in a direction parallel to a central axis of the tubular; and
a gamma ray shield disposed about a portion of an outer perimeter of the pressure housing adjacent the tubular, wherein the gamma ray shield reduces an amount of gamma rays produced within the tubular that reach the gamma radiation detector, and enables azimuthal measurement; and
shielding thermal neutrons from the detector while operating the detector to obtain a measure of a property of the subterranean formation.

18. The method of claim 17, wherein the shielding of the thermal neutrons from the detector comprises providing a neutron shield disposed about a circumference of the tubular along at least the axial length of the detector, wherein the neutron shield reduces an amount of neutrons that passes from the wellbore and/or the formation through the tubular during operation of the detector assembly, while allowing transmission of gamma rays therethrough to the detector.

19. The method of claim 18, wherein the neutron shield further comprises a shell of a shell material, wherein the shell material comprises a material having a yield strength sufficient for use in the wellbore.

20. The method of claim 19, wherein the neutron shield further comprises a deposition material deposited on the shell, wherein the deposition material is capable of absorbing neutrons from the wellbore and producing gamma rays having a lower energy than neutron-induced gamma rays produced in the formation.

* * * * *

UNITED STATES PATENT AND TRADEMARK OFFICE
CERTIFICATE OF CORRECTION

PATENT NO. : 10,948,624 B1
APPLICATION NO. : 16/694418
DATED : March 16, 2021
INVENTOR(S) : Jeffrey Clayton Neely Page 1 of 1

It is certified that error appears in the above-identified patent and that said Letters Patent is hereby corrected as shown below:

In the Specification

-Column 10, Line 25, replace "inside circumferential area $C_o$" with -- inside circumferential area $C_{i,s}$ --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*